(12) United States Patent
Gee

(10) Patent No.: US 6,178,395 B1
(45) Date of Patent: Jan. 23, 2001

(54) SYSTEMS AND PROCESSES FOR DATA ACQUISITION OF LOCATION OF A RANGE OF RESPONSE TIME

(75) Inventor: Jason Gee, Pasadena, CA (US)

(73) Assignee: Scientific Learning Corporation, Berkeley, CA (US)

( * ) Notice: Under 35 U.S.C. 154(b), the term of this patent shall be extended for 0 days.

(21) Appl. No.: 09/164,989

(22) Filed: Sep. 30, 1998

(51) Int. Cl.⁷ ..................................................... G06F 9/45

(52) U.S. Cl. ........................... 703/22; 702/122; 434/118; 434/322; 434/362

(58) Field of Search ....................... 395/500.43; 702/126, 702/122–125; 434/118, 185, 322, 350, 362; 327/291; 703/22

(56) References Cited

U.S. PATENT DOCUMENTS

| | | | |
|---|---|---|---|
| 4,772,206 | * 9/1988 | Kerr et al. | 434/118 |
| 5,220,658 | * 6/1993 | Kerr et al. | 395/500.43 |
| 5,333,302 | * 7/1994 | Hensley et al. | 395/500.43 |
| 5,430,660 | * 7/1995 | Lueker et al. | 702/124 |
| 5,577,919 | * 11/1996 | Collins et al. | 434/322 |
| 5,812,780 | * 9/1998 | Chen et al. | 702/122 |
| 5,813,862 | 9/1998 | Merzenich et al. | 434/185 |
| 5,881,268 | * 3/1999 | McDonald et al. | 703/22 |
| 5,927,988 | * 7/1999 | Jenkins et al. | 434/118 |
| 5,963,726 | * 10/1999 | Rust et al. | 703/13 |

OTHER PUBLICATIONS

Fast ForWord™, Internet–http://www.scientificlearning.com (Downloaded Aug. 11, 1998).

Kao et al.; "A User–Oriented Synthetic Workload Generator", Proceedings of the 12th International Conference on Distributed Computing Systems, pp. 270–277, Jun. 1992.*

Sakamoto et al.; "A Response Model for CG Character Based on Timing of Interactions with Multimodal Human Interface", Proceedings of the 1997 International Conference on Intelligent User Interfaces, pp. 257–260, Jan. 1997.*

Kishi, N.; "SimUl: Graphical User Interface Evaluation Using Playback", Proceedings of the Sixteenth Annual International Computer Software and Applications Conference, pp. 121–127, Sep., 1992.*

(List continued on next page.)

Primary Examiner—Kevin J. Teska
Assistant Examiner—Douglas W Sergent
(74) Attorney, Agent, or Firm—Beyer Weaver & Thomas, LLP

(57) ABSTRACT

A system and process for calibrating the presentation of stimuli and/or hit window by ascertaining the hit window relative to stimuli presented on a computer. The system includes a first circuit for generating the stimuli, and a second circuit for simulating responses to the stimuli. The response initially does not overlap the hit window and causes an incorrect response cue to be generated. Either the start time of the response or the duration of the response may then iteratively be modified to cause the response to eventually overlap the hit window, thereby generating a correct response cue. The two consecutive responses that cause the hit window to be nonoverlapped and then overlapped are identified for the purpose of ascertaining the range of time that includes the start of the hit window. Either the start time of the response or the duration of the response may be iteratively varied to cause the hit window to be nonoverlapped by the response, thereby causing the incorrect response cue to be generated. The two consecutive responses that cause the hit window to be overlapped and then nonoverlapped are identified for the purpose of ascertaining the range of time that includes the end of the hit window. The timing data pertaining to the hit window may then be employed to adjust the presentation of the stimuli and/or the hit window to conform to the desired presentation timing.

14 Claims, 6 Drawing Sheets

OTHER PUBLICATIONS

Kao et al.; "A User–Oriented Synthetic Workload Generator", Proceedings of the 12th International Conference on Distributed Computing Systems, pp. 270–277, Jun. 1992.*

Sakamoto et al,; "A Response Model for CG Character Based on Timing of Interactions with Multimodal Human Interface", Proceedings of the 1997 International Conference on Intelligent User Interfaces, pp. 257–260, Jan. 1997.*

Kishi, N.; "SimUl: Graphical User Interface Evaluation Using Playback", Proceedings of the Sixteenth Annual International Computer Software and Applications Conference, pp. 121–127, Sep. 1992.*

Woodruff et al. "Buffering of Intermediate Results in Dataflow Diagrams", Proc. 11th IEEE Inter. Symposium on Visual Languages pp. 187–194, Sep. 1995.*

National Instruments IEEE 488 and VXIbus Control, Data Acquisition and Analysis, Catalog, 1994, p. IV.*

* cited by examiner

SYSTEMS AND PROCESSES FOR DATA ACQUISITION OF LOCATION OF A RANGE OF RESPONSE TIME

BACKGROUND OF THE INVENTION

The present invention relates to systems and methods for calibrating sensory stimuli. More particularly, the present invention relates to systems and methods that calibrate sensory stimuli to ensure that the beginning and the duration of a range of response time is substantially consistent across computer platforms.

Diagnostic/training computer software typically present sensory stimuli, such as sound and/or tone, visual stimuli, touch stimuli, or the like across a user interface with the intention of eliciting a response from the user. The diagnostic and training software, for example, may be implemented in an educational program that is designed to build language skills in children. Development of language skills is especially important in those children who lack the necessary skills to make reliable distinctions among speech sounds and therefore suffer from poor language comprehension and/or speech production problems.

In order to make the diagnostic and/or training process a positive experience for the user, the diagnostic/training software is often presented to the user in the form of a computer game. In the computer game, the user may be rewarded or penalized points depending on the user's response and reaction time to sound and/or tone stimuli. By way of example, one such computer diagnostic/training software is Old McDonald's Flying Farm (OMDFF), commercially available from Scientific Learning Corporation of Berkeley, Calif. Although the disclosure herein focuses on sound and/or tonal stimuli to simplify the discussion, it should be borne in mind that the issues presented herein and the techniques proposed by the present invention are also applicable when other forms of sensory stimuli are employed.

By way of example, the sound and/or tone stimuli may include a string of tones and may be stored in a memory storage device, e.g., a CD ROM or a magnetic media. Such stimuli are commonly referred to in the art as "STIMs". FIG. 1 shows a representative STIM 10 and a timeline associated with STIM 10. STIM 10 includes several dummy tones 20 followed by a target tone 26. In response to STIM 10, a user attempts to discern between dummy tones 20 and target tone 26 to identify a speech pattern associated with STIM 10. By way of example, dummy tones 20 may denote a "BA" sound and target tone 26 may denote a "DA" sound, and the user attempts to distinguish between the "BA" sound and the "DA" sound by activating a user input device (e.g., clicking on a mouse) when the user believes that the "DA" sound has been played. The user's response to the STIM presented and the user's reaction time to target tone 26 provides insight into the user's ability to recognize language and speech patterns.

For simplicity's sake, the remainder of the disclosure will focus on the mouse as the user input device employed by the user to signal his response. It should be noted, however, that the techniques disclosed herein are also applicable when other types of user input devices are employed, e.g., keyboards, microphones, virtual reality input devices, or other transducers.

Before the timeline of STIM 10 begins at time T equals zero, there exists a seek time 12, during which the computer or a processor employed to produce the stimuli seeks the sound file containing STIM 10 that is stored on the memory storage device. Once the sound file is found, the timeline of STIM 10 begins at time T equals zero, as shown in FIG. 1. As the time progresses after time T equals zero, a dead time 14, which may last about 100 ms, precedes the actual playback of STIM 10. During dead time 14, no sound is typically played by the computer or processor.

The first dummy tone 20 is heard after a period of time 18 known as inter stimulus interval (ISI) elapses. Each of dummy tones 20 lasts for a period of time 16 and is separated from one another by an ISI 18. In other words, the length of an ISI spans from the end of a previous dummy tone to the beginning of a subsequent dummy tone. According to FIG. 1, a string of dummy tones 20 and ISIs 18 are presented to the user. After the last dummy tone 20 is played and the last ISI 18 elapses, however, target tone 26 is presented.

A lock out time 22 typically follows the last ISI 18. During this period of time, the user is typically locked out from registering a response. The lock out time accounts for a period of time required by an average human being to register a viable cognitive input, i.e. hear, recognize and then respond to the target tone. After the lock out time has expired, the software is ready to receive the user's response to the target tone for a period of time that is referred to as the "hit window."

It is important to note that in order to respond to STIM 10 correctly, the user should respond within the duration of hit window 24. If the user responds before hit window 24 or after hit window 24 then the user's response is deemed an incorrect response. The time period of hit window 24 begins at a starting time of the hit window and concludes at an ending time of the hit window, and the time period spanning between the starting and ending of the hit window typically equals a dummy letter. The dummy letter is defined as the sum of duration of a dummy tone (shown by reference number 16 in FIG. 1) and an ISI 18.

Measuring from the point when time equals zero, the starting time of the hit window is defined as the sum of the dead time 14, the lockout time 22 plus the product of the number of dummy tones 20 in the STIM and the duration of a dummy letter. The ending time of the hit window may be calculated as the sum of dead time 14, lockout time 22, the product of the number of dummy tones 20 in the STIM and the duration of a dummy letter, plus the duration of hit window 24.

Ideally, the duration of the hit window as well as its beginning and/or ending should stay constant relative to the stimuli irrespective of the computer employed to administer the computer-implemented diagnostic/training regime. Unfortunately, when the computer that is employed to administer the computer-implemented diagnostic/training regime is implemented differently from the computer that is employed to author the diagnostic/training software, the duration of the hit window changes and/or the hit window undesirably shifts or drifts from its relative preset position in the sound file. This can happen if the administering computer supports a different platform, has a different hardware configuration (e.g., different processor, bus, memory capacity, I/O subsystem, or the like), or is simply implemented with a different operating system/browser than that associated with the authoring computer. As an example, although the target tone may be presented to the user at substantially the same time when different computers are employed to run the software, the lock out time that follows the target tone may have different durations.

By way of example, when the software-authoring computer is an Apple MacIntosh® BY Apple Computer Inc. of Cupertino, Calif., and the software is subsequently executed on an Intel-based computer (also known as an IBM-compatible computer), it has been observed that typically the lock out time on the IBM-compatible computer increases relative to the lockout time initially set on the Apple MacIntosh®. Thus, the hit window is presented to the user later in time when using an IBM-compatible computer than if an Apple computer is used.

Because of the shift or change in duration in the hit window, it is difficult to analyze users' responses in a meaningful way when different administering computers are employed. This is because a response which is timely and correct on one computer may be deemed untimely and incorrect in another computer, although neither the underlying diagnostic/training software nor the user's response has changed.

What is therefore needed is a process and a system that can quickly and accurately determine the location of the hit window relative to the stimulus and its duration when a given computer is employed to administer the diagnostic/training software.

SUMMARY OF THE INVENTION

The invention relates, in one embodiment, to a system and process for ascertaining the hit window relative to stimuli presented on a computer. In one embodiment, the system includes a first circuit for generating the stimuli, and a second circuit for simulating responses to the stimuli. The response initially does not overlap the hit window and causes an incorrect response cue to be generated. Either the start time of the response or the duration of the response may then iteratively be modified to cause the response to eventually overlap the hit window, thereby generating a correct response cue. The two consecutive responses that cause the hit window to be nonoverlapped and then overlapped are identified for the purpose of ascertaining the range of time that includes the start of the hit window.

In one embodiment, either the start time of the response or the duration of the response may be iteratively varied to cause the hit window to be nonoverlapped by the response, thereby causing the incorrect response cue to be generated. The two consecutive responses that cause the hit window to be overlapped and then nonoverlapped are identified for the purpose of ascertaining the range of time that includes the end of the hit window. The range of time that includes the start of the hit window or the end of the hit window may be narrowed by iteratively using smaller increment steps, thereby allowing the hit window to be ascertained with greater precision. The timing data pertaining to the hit window may then be employed to adjust the presentation of the stimuli and/or the hit window to conform to the desired presentation timing.

These and other features of the present invention will be described in more detail below in the detailed description of the invention and in conjunction with the following figures.

BRIEF DESCRIPTION OF THE DRAWINGS

To facilitate discussion.

DETAILED DESCRIPTION OF THE PREFERRED EMBODIMENTS

The present invention provides a system and process for quickly and precisely determining the location and duration of a hit window. In the following description, numerous specific details are set forth in order to provide a thorough understanding of the present invention. It will be apparent, however, to those skilled in the art, that the present invention may be practiced without some or all of the specific details.

In accordance with one embodiment, the present invention provides a system and process that automatically determine the location and duration of a hit window relative to a stimulus in a given administering computer. The data pertaining to the location and duration of the hit window in a given administering computer may be employed by the manufacturer of the diagnostic/training software to standardize the presentation of stimuli and the acquisition of user response so that meaningful assessment of a user's performance may be made across different administering computers.

Figure 2:
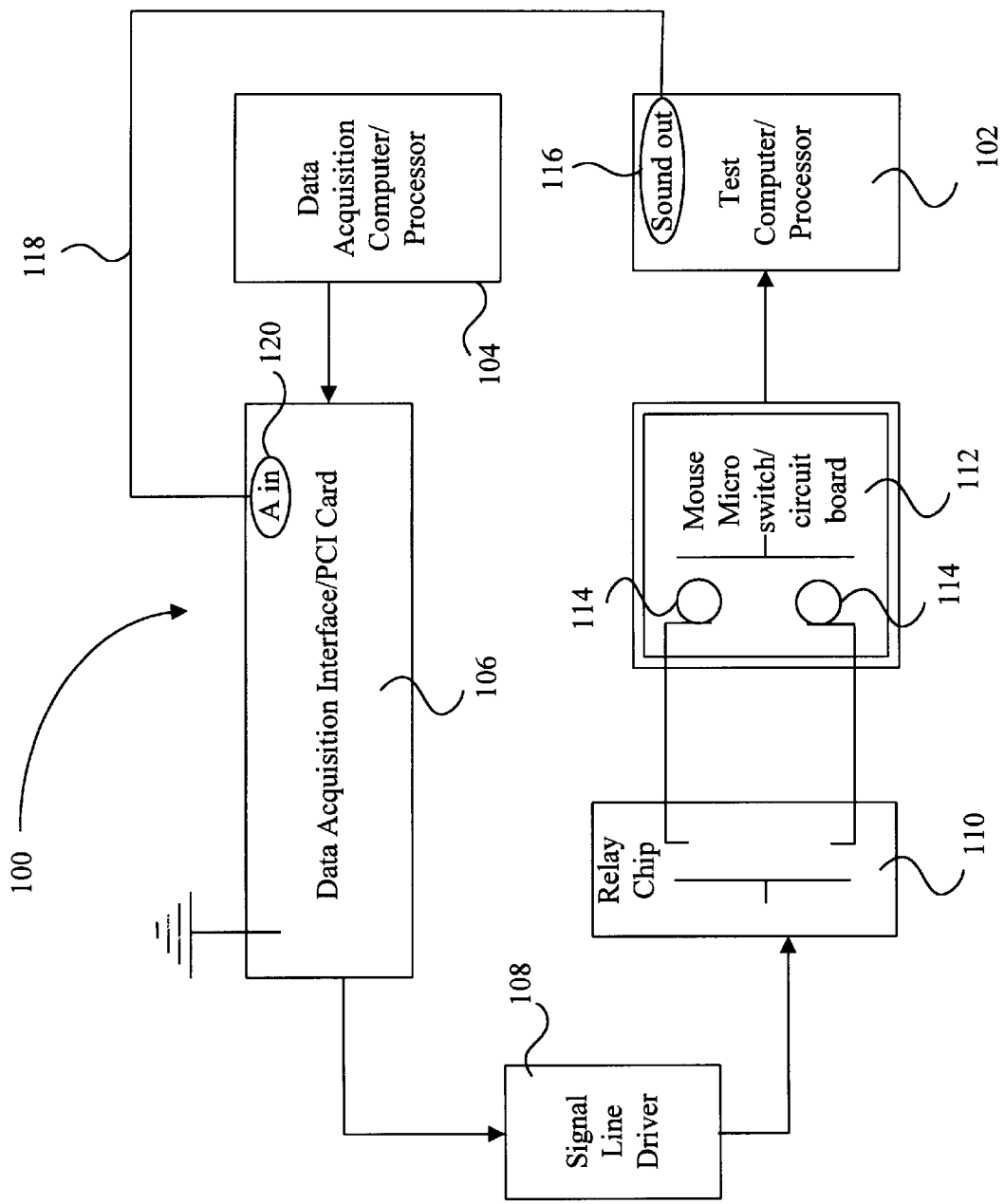
FIG. 2 is block diagram of an interactive temporal sound station, according to one embodiment of the present invention, that is capable of determining the location of a range of response time to a stimulus.

FIG. 2 shows an interactive temporal sound test station 100, according to one embodiment of the present invention, employed for acquiring data regarding the location of range of response time. In the disclosure, the terms "hit window" and "range of response time" are synonymous and are used interchangeably. As mentioned earlier, although the disclosure herein focuses on sound and/or tonal stimuli to simplify the discussion, it should be borne in mind that the issues presented herein and the techniques proposed by the present invention are also applicable when other forms of sensory stimuli are employed. If other forms of stimuli are involved, appropriate transducers may be substituted for the sound generators and receivers mentioned herein.

Temporal sound test station 100 includes a test computer/processor 102 having a sensory data output port such as a sound output port 116. Test computer/processor 102 is, in one embodiment, a processor capable of generating a stimulus, e.g., an audio or a visual stimulus, accompanied by a range of response time, during which the processor receives a correct response to the stimulus. By way of example, test computer/processor 102 may represent a microcomputer having a sensor data output port.

Sound output port 116 is shown connected to a data acquisition interface/IO card 106, which is connected to or is part of a data acquisition computer/processor 104. By way of example, as shown in the embodiment of FIG. 2, sound output port 116 is connected to an input port 120 of data acquisition interface/IO card 106 via a connection line 118. Connection 118 connects the audio signal generated from test computer/processor 102 to the analog input port of a data acquisition/IO card 106.

Data acquisition computer/processor 104 has stored on it data acquisition instructions to drive a relay chip 110 (via data acquisition interface/IO card 106 and a signal line driver 108) in order to cause mouse 112 to provide mouse up and mouse down signals of appropriate durations. The functions of data acquisition computer/processor 104 will be discussed in detail later herein.

Data acquisition interface/IO card 106 is connected to relay chip 110 through a signal line driver 108, which amplifies a voltage output signal generated from data acquisition interface/IO card 106 to drive relay chip 110. Signal line driver 108 includes any device that is capable of amplifying a voltage signal to drive a relay chip. By way of example, signal line driver 108 is SN74LS240N Line Driver, which commercially available from Texas Instruments of Dallas, Tex. In accordance with one embodiment of the present invention, relay chip 110 is W121 DIP-12 Digital Relay, which commercially available from Magnacraft. Terminals of relay chip 110 are connected to terminals or microswitches 114 of mouse 112 such that when a voltage output signal of the appropriate magnitude is sent by data acquisition interface/IO card 106 and relay chip 110 is activated, terminals of relay chip 110 short-circuit terminals 114 of mouse 112.

In the example of FIG. 2, when relay chip 110 is activated and terminals 114 of mouse 112 are short-circuited, a "mouse down" signal or command is sent by mouse 112 and received by test computer/processor 102. Furthermore, in its inactive or default position when terminals 114 of mouse 112 are not short-circuited by terminals of relay chip 112, mouse 112 registers a "mouse up" signal in the test computer/processor 102.

The mouse down signal generated simulates the response of an user who is responding using a mouse 112 to a stimulus generated by test computer/processor 102. The mouse up signal simulates a non-response by the user who is presented with a stimulus. Thus, the temporal sound station under operation effectively modifies the state (i.e. from an inactive state to an active state or vice versa) of an input device such as a mouse by providing external electrical engineered access to the microswitches or terminals of the mouse.

During operation of temporal sound station 100, test computer/processor 102 receives the mouse up or mouse down signal from mouse 112 and ascertain whether the response generated is a correct or incorrect response. A mouse down signal is deemed a correct response to the stimulus if at least a portion of a duration of the mouse down signal is within the range of response time. In contrast, a mouse down signal is deemed an incorrect response if no part of the mouse down signal is within the range of response time or if a mouse up signal is received by test computer/processor 102 within the range of response time.

In response to the received mouse up or mouse down signal, test computer/processor 102 produces either a false cue such as a "bonk" sound when an incorrect response to the stimulus is registered in test computer/processor 102 and produces a true cue when a correct response to the stimulus is registered in test computer/processor 102.

These generated cues may then be employed by data acquisition computer/processor 104 (via its data acquisition interface/IO card 106) to determine the beginning, end, and duration of the hit window in accordance with the process outlined below. In general, test computer/processor initiates the process by generating the stimulus. Data acquisition computer/processor 104 generates the signals that causes mouse 112 to send the simulated mouse up or mouse down signal to test computer/processor 102. Test computer/processor 102 then determines whether the responses are correct or incorrect based on the hit window particular to the test computer/processor 102 and provides cues that signal whether the responses are correct or incorrect. The cues are then received by data acquisition computer/processor 104, which analyzes the cues to determine the beginning, end, and duration of the hit window that is particular to test computer/processor 102.

It is preferable that the cues be readily distinguishable by data acquisition computer/processor 104 from other sounds/ tones generated as part of the stimuli. By way of example, the cues may have a different frequency and/or amplitude from the sounds/tones of the stimuli.

Figure 3:
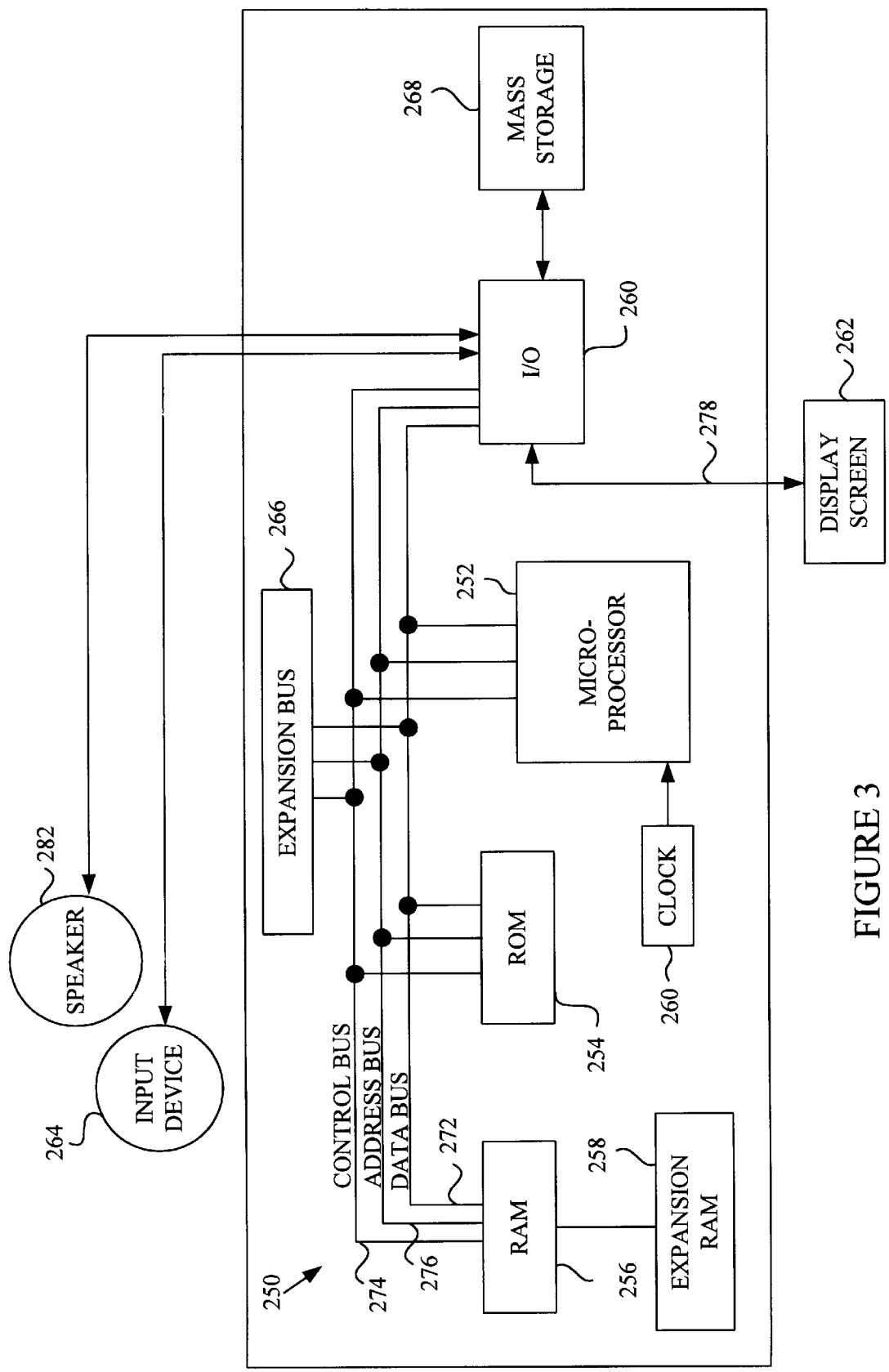
FIG. 3 illustrates a computer, in accordance with one embodiment of the present invention, for generating stimuli or acquiring data regarding the position of a range of response time relative to a stimulus.

FIG. 3 shows a general purpose computer system, representing a computer that may be suitably employed to generate the diagnostic/training software, as the test computer and/or the data acquisition computer or may be suitable for implementing at least some of the steps of the present inventive hit window calibration process. Referring to FIG. 3, a computer system 250 in accordance with the present invention includes a central processing unit (CPU) 252, read only memory (ROM) 254, random access memory (RAM) 256, expansion RAM 258, input/output (I/O) circuitry 260, display assembly 262, input device 264, and expansion bus 266. Computer system 250 may also optionally include a mass storage unit 268 such as a disk drive unit or nonvolatile memory such as flash memory and a real-time clock 260. In one embodiment, mass storage unit 268 may include units which utilizes removable computer readable media, such as floppy disks, opto-magnetic media, optical media, and the like for the storage of programs and data.

CPU 252 is preferably a commercially available, single chip microprocessor such as one of the Intel X86 or Motorola 680XX family of chips, a reduced instruction set computer (RISC) chip such as the PowerPC™ microprocessor available from Motorola, Inc, or any other suitable processor. CPU 252 is coupled to ROM 254 by a data bus 272, control bus 274, and address bus 276. ROM 254 may partially contain the basic operating system for the computer system 250. CPU 252 is also connected to RAM 256 by busses 272, 274, and 276 to permit the use of RAM 256 as scratch pad memory. Expansion RAM 258 is optionally coupled to RAM 256 for use by CPU 252. CPU 252 is also coupled to the I/O circuitry 260 by data bus 272, control bus 274, and address bus 276 to permit data transfers with peripheral devices.

I/O circuitry 260 typically includes a number of latches, registers and direct memory access (DMA) controllers. The purpose of I/O circuitry 260 is to provide an interface between CPU 252 and such peripheral devices as display assembly 262, input device 264, mass storage 268, speaker 282, and/or any other I/O device including a sound output port (shown as reference numeral 116 in FIG. 2). Display assembly 262 of computer system 250 is an output device for displaying objects and other visual representations of data.

The screen for display assembly 262 can be a device that uses a cathode-ray tube (CRT), liquid crystal display (LCD), or the like, of the types commercially available from a variety of manufacturers. Input device 264 can be a keyboard, a mouse, a stylus working in cooperation with a position-sensing display, a touch sensitive display screen or the like. Alternatively, input device 264 can be an embedded RF digitizer activated by an "active" RF stylus. As a further alternative, input device 264 may be any type of switches capable of communicating a user response to computer system 250. Therefore, as used herein, the term input device will refer to any mechanism or device for entering data and/or pointing to a particular location on a screen of a computer display. The aforementioned input devices are available from a variety of vendors and are well known in the art.

Some type of mass storage 268 is generally considered desirable. However, mass storage 268 can be eliminated by providing a sufficient amount of RAM 256 and expansion RAM 258 to store user application programs and data. In that case, RAMs 256 and 258 can optionally be provided with a backup battery to prevent the loss of data even when computer system 250 is turned off. However, it is generally desirable to have some type of long term mass storage 268 such as a commercially available hard disk drive, nonvolatile memory such as flash memory, battery backed RAM, PC-data cards, or the like.

In one embodiment, computer system 250 system is employed to generate tonal stimuli of the various tests and the acoustical signals are conveyed to data acquisition interface/IO card 106 using a sound output port 116 as shown in FIG. 2. In the same or in another embodiment, data acquisition computer/processor 104 is substantially similar to computer system 250 that is employed to perform at least some of the steps of the inventive data acquisition process. By way of example, a computer system, which serves as data acquisition computer/processor 104 and is substantially similar to computer system 250, analyzes and responds to the audio signal as described below.

It should be borne in mind that although computer system 250 is discussed in detail herein to facilitate discussion, the inventive range of response time location technique may be practiced on a variety of suitable computer-implemented systems. By way of example, the inventive range of hit window calibration technique disclosed herein may be implemented via a computer network, such as a local area network (LAN), wide area network (WAN) or a global computer network such as the Internet. In the latter case, the inventive range of response time location technique may be implemented as downloadable computer software and data (e.g., applets). The downloadable computer software and data may be kept on one or more servers on the network, accessible by any client computer or terminal capable and authorized for such access. To facilitate testing, the downloadable computer software and data can be downloaded once and reused over and over at the client computer/terminal. Alternatively, the downloadable computer software and data can be downloaded for each individual testing session via the network as needed. Network computing techniques and implementations therefor are well known in the art and are not discussed in great detail here for brevity's sake.

Figure 4:
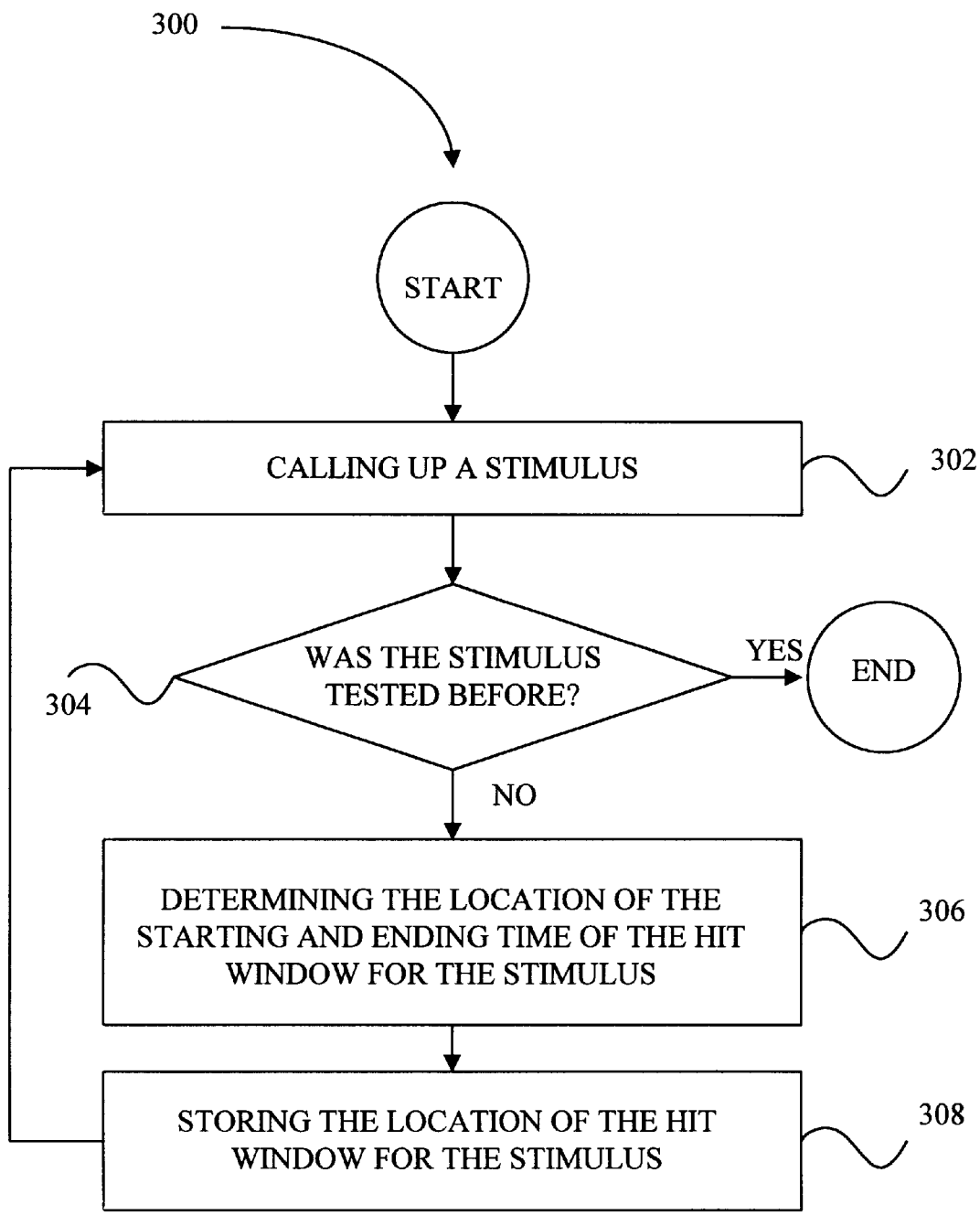
FIG. 4 is a flow chart of a data acquisition process, according to one embodiment of the present invention, as applied to quality assurance testing of diagnostic/training software that generate stimuli.

FIG. 4 is a flowchart of a calibration process 300, according to one embodiment of the present invention, as applied to quality assurance testing of diagnostic/training software that generate stimuli on a specific computer. Before calibration process 300 begins, the diagnostic/training software (such as OMDFF) may be initialized along with the data acquisition processor 106 of FIG. 2 to synchronize the progression of presenting the stimulus by the software and the mouse down signal durations generated by data acquisition computer/processor 104. By way of example, before calibration process 300 begins, a mouse down and a mouse up signal each of a predetermined duration, e.g., about 100 ms, are generated at mouse 112 under control of data acquisition computer/processor 104. This signal combination, which is received by test computer/processor 102, is understood by test computer/processor 102 as priming and cueing up the stimulus file stored on a memory device and is used to synchronize the mouse down signal duration with the internal timing of test computer/processor 102. The above-described initialization step, therefore, serves to eliminate any seek time variances that may occur when searching for a stimulus.

Figure 1:
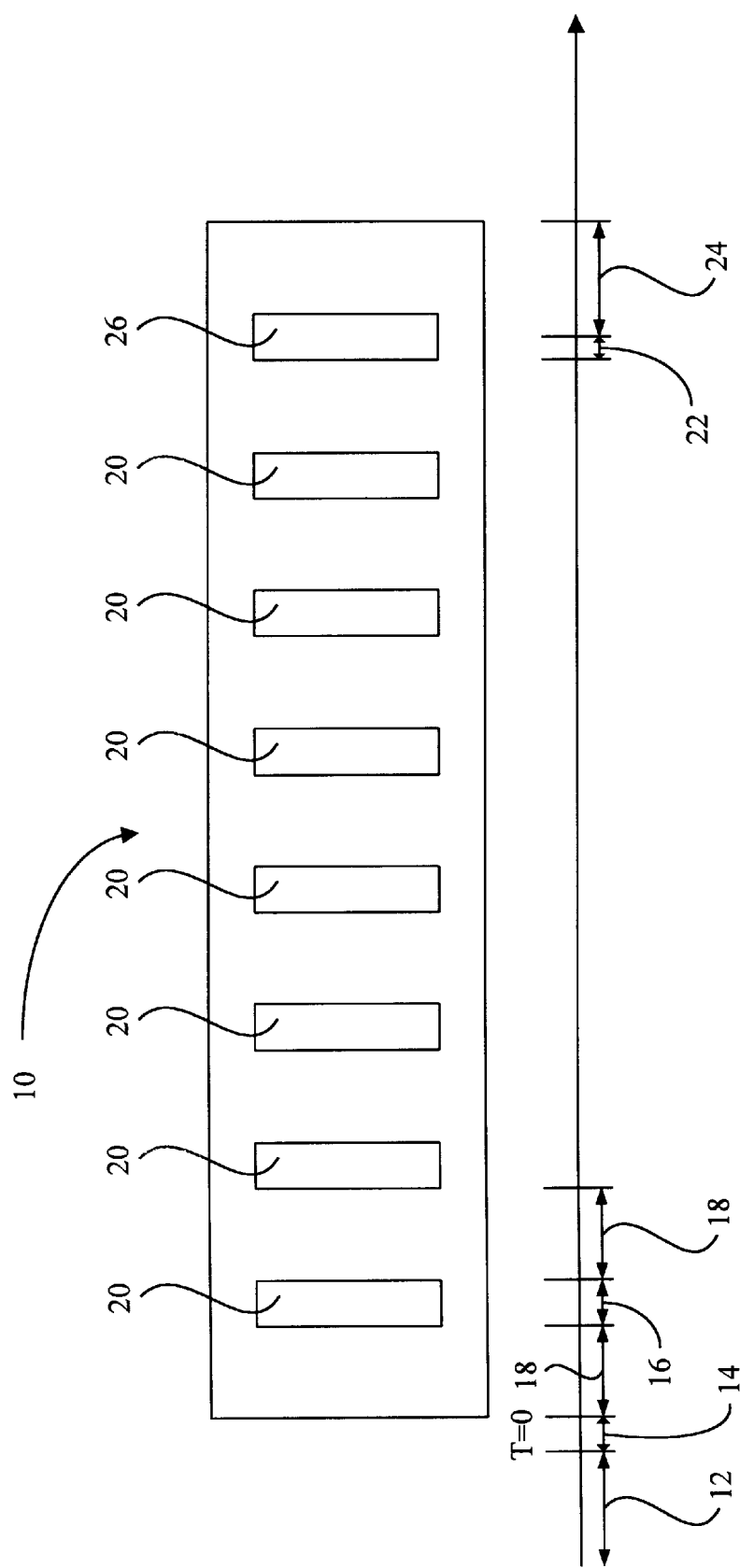
FIG. 1 shows a stimulus (STIM) provided by a typical diagnostic/training software and the timeline associate with the stimulus (STIM).

Process 300 may begin with a step 302, which includes calling up a stimulus, e.g., STIM 10 of FIG. 1. In this step, the stimulus that is stored in a CD-ROM or another memory storage device is retrieved on test computer/processor 102 of FIG. 2, for example.

Next in a step 304 it is inquired whether the stimulus retrieved in step 302 was tested before. If it is determined that the stimulus was tested before and the location of the hit window or range of response time associated with the stimulus was determined previously, then process 300 comes to an end. In other words, there is no need to recalibrate unless the administering computer (e.g., test computer/processor 102) has been changed in some ways. If it is determined, however, that the stimulus retrieved in step 302 was not tested before, then process 300 proceeds to a step 306 described hereinafter.

Step 306 includes determining the location of the starting and ending time of the hit window for the stimulus. As will be explained later in detail, according to one embodiment of the present invention, a sequence of "true-false" responses are obtained and used to identify a range of time which includes the starting time of the hit window. On the other hand, a sequence of "false-true" responses are obtained and used to identify another range which includes the ending time of the hit window. Once the starting and ending time values of the hit window are identified for a particular stimulus in step 306, they are stored in step 308.

In accordance with one embodiment of the present invention, the estimated starting time values of the hit window are stored as elements of a start hit window time adjustment matrix and the estimated ending time values of the hit window are stored as elements of a end hit window time adjustment matrix. By way of example, each of the start and end hit window time adjustment matrices are 6×90 grid of values, which provide the estimated time values preferably in milliseconds for different STIMs having varying number of dummy tones, e.g., 3 to 8 dummy tones, arranged in different columns within the same row. In different columns of the above-mentioned matrices, however, estimated time values for STIMs having 18 different ISIs are provided in different rows within the same column. In this embodiment, therefore, the present invention recognizes that the position of the hit window relative to the stimulus varies depending on the number of tones in a STIM and the duration of ISIs in the STIM. However, this is but one way to utilize the start and end time values identified by the inventive techniques disclosed herein.

After start and end hit window time adjustment matrices are generated upon the conclusion of process 300 as described above, the elements of these matrices may be stored in data acquisition computer/processor 104 and are used in a subsequent data transformation step, in which the undesired drifted or shifted location of the range of response times is modified such that the range of response time is presented to a user of the diagnostic/training software at an intended time or predetermined offset relative to the stimulus. The data transformation step may be implemented by modifying the software code of the diagnostic/training software based on the values of time in the start and end hit window time adjustment matrices. In other words, the matrices may be used to generate a correction factor in the software code and thereby allow the presentation of the range of response time to the user at the desired time. It is important to note that the matrices mentioned above can be generated and stored after testing a certain computer once and thereafter the changes to the software code can be implemented based on the resulting matrices when that computer is subsequently used. Thus, testing according to the present invention may be performed on several different computers (i.e. supporting different platforms, of different models, or having different hardware configurations than the authoring computer) and the resulting matrices may be stored and used later to standardize the presentation of the hit window on different computers.

In another embodiment, the start and end hit window time may be obtained for the computer being tested, and the values obtained may be employed to adjust the presentation of the stimuli on that particular computer so that the stimuli and the hit window may be presented at the time intended. By way of example, the arrangement of FIG. 2 may be employed to generate adjustment data for different administering computer. The adjustment data may be employed to modify the diagnostic/testing software at manufacturing time so that the stimuli and hit window will be properly presented on a particular administering computer.

Alternatively, the adjustment data for all computers may be furnished with the diagnostic/testing software and adjustment may be made upon installation or startup when the user, who may enter the data pertaining to the hardware, configuration and/or operating system of the administering computer so that the corresponding adjustment data may be employed to adjust the presentation of the stimuli/hit window. As a further alternative, the adjustment data for all computers may be furnished with the diagnostic/testing software and adjustment may be made automatically upon installation or startup when the software polls the administering computer for data pertaining to the hardware, configuration and/or operating system of the administering computer so that the corresponding adjustment data may be employed to adjust the presentation of the stimuli/hit window.

Figure 5A:
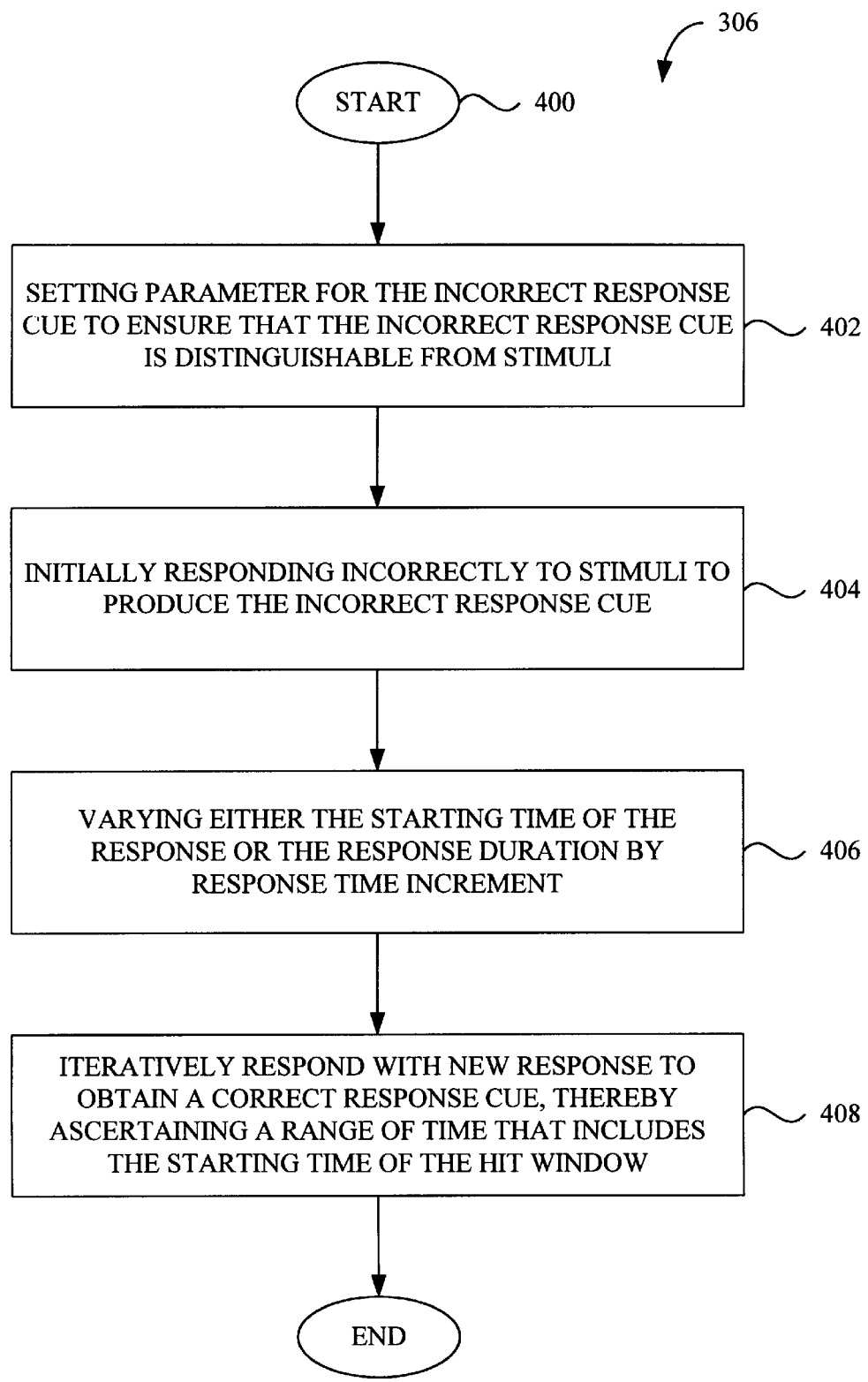
FIGS. 5A and 5B show a detailed flowchart of a process, according to one embodiment of the present invention, of determining the location of a range of response time mentioned in FIG. 4.
Figure 5B:
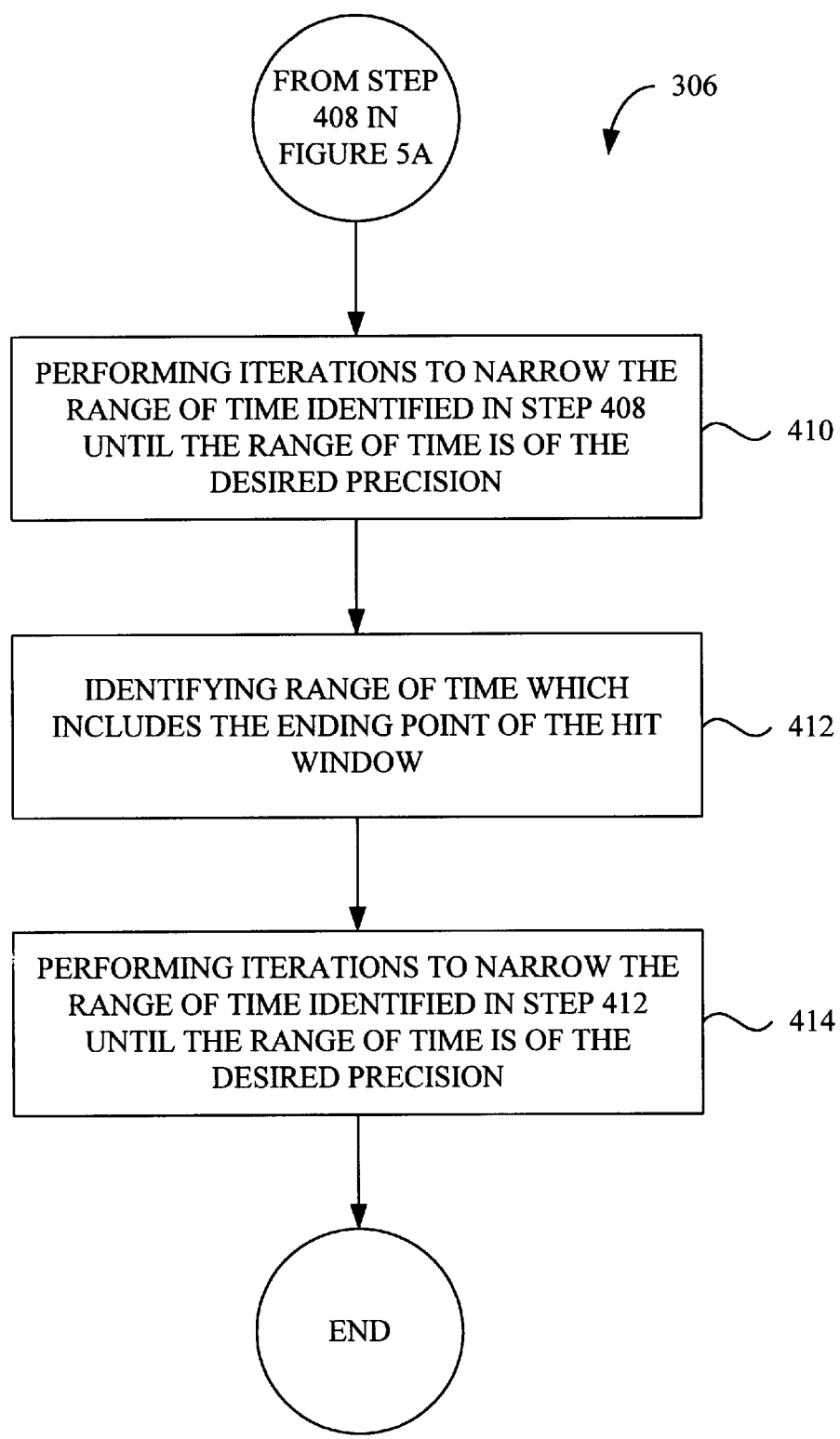

FIGS. 5A and 5B show in accordance with one embodiment of the present invention a detailed flowchart of step 306, which includes determining the location of the starting and ending time of the hit window of a stimulus, as mentioned in FIG. 4. After step 304 concludes as described above in reference to FIG. 4 and it is determined that a particular stimulus was not tested before, a step 402 is carried out. Step 402 includes setting the incorrect response cue (to a stimulus) that is furnished by test computer/processor 102 appropriately so it may be readily distinguished by data acquisition computer/processor 104 to be different from the signals associated with the stimuli. By way of example, the incorrect response cue may have a magnitude, frequency, or duration that is higher (or lower) than the sounds or tones of the stimuli.

In this step, according to one embodiment of the present invention, voltages of signals produced by all the tones (e.g., dummy and target tones) and/or sounds (e.g., sound produced by the diagnostic/training software for correctly responding to the stimulus) are set below the voltage of the signal produced by the incorrect response cue (e.g., the "bonk" sound), which is furnished by diagnostic/training software when a stimulus generating processor receives an incorrect response to the stimulus. In the embodiment of FIG. 2, for example, this step allows the data acquisition card 106 to distinguish between the incorrect response cue and all other tones and sounds made by test computer/processor 102 that is executing the diagnostic/training software (e.g., OMDFF) by virtue of the higher voltage associated with the incorrect response cue than is produced by test computer/processor 102 when an incorrect response to the stimulus is received.

In general, it is desirable that the incorrect response cue produces a signal or series of signals that can be readily distinguished that those associated with the stimuli. The correct response cue may likewise be set to be different from both the correct response cue and the stimuli.

Next, a step 404 includes initially responding incorrectly to the stimulus by activating and deactivating the response switch prior to the start of the hit window. This incorrect response will generate an incorrect response cue out of the test computer/processor, which starts the false/true series of responses subsequently employed to determine the starting time of the hit window. In most instances, the specification accompanying the diagnostic/training software provides a time when the starting time of the hit window is expected to be presented to a user. Such information allows the present invention to compute an appropriate (duration of) mouse down time, which is arrived at by subtracting an offset from the expected location of the starting time of the hit window. The offset should be sufficiently large to allow the response switch (e.g., the mouse) to be activated and deactivated (e.g., mouse down and up) before the start of the hit window. The response of step 404 ensures an incorrect response cue to be generated and received by the data acquisition computer/processor 104.

By way of example, if it is expected that the starting time of the hit window is presented to a user after 1000 ms from time T equals zero, then the mouse down period should begin and end before T=1000 ms. In one example, the offset may be, for example, 200 ms. In another example, the offset may be 1000 ms, i.e., the mouse down begins at time T=0. In accordance with one embodiment, the offset in the present invention may be between about 5% and about 30%, more preferably about 20% of an expected amount of elapsed time (from time T=0) before the starting time of the hit window is presented to the user.

In step 406, the response time is modified by increasing the time value of the beginning of the response by a predefined response time increment. The term "response time increment" used in connection with the description of this invention refers to a unit of time that is added to the beginning of a response time or mouse down time.

In one embodiment of step 406, the response time increment can be expressed as a percentage of the time elapsed between the expected position of the starting time of the hit window and the start of the stimulus. Alternatively, in another embodiment, the response time increment can be expressed as a percentage of the offset duration.

Next, a step 408 includes iteratively increasing the time value of the beginning of the response by iteratively adding the increment response time until a correct response cue is produced. By way of example, if the beginning of the mouse down time associated with step 404 is about 800 ms and the response time increment is about 20 ms, then about 10 test trials (or some reasonable number above that to ensure that the response time eventually falls within the hit window) may be performed. Thus, the beginning of the mouse down time will be (in milliseconds) of 800, 820, 840, 860 and so on to 1000.

If it is established that the correct response cue is achieved between, for example, a response having a starting time of 840 ms and a response having a starting time of 860 ms, then the beginning of the hit period must fall somewhere between (840 ms+duration of response) and (860 ms+duration of response).

In an alternative embodiment, the starting time of the response may be fixed at a given time value that is less than the time value of the beginning of the hit window. After the first incorrect response cue is recorded (as the end of the response time falls short of the beginning of the hit window), the duration of the response time may be iteratively lengthened until the response overlaps the hit window and produces a correct response cue. If it is established that the correct response cue is achieved between, for example, a first response having a starting time of 800 ms and a duration of 40 ms and a second response having the same starting time of 800 ms but a duration of 60 ms, then the beginning of the hit period must fall somewhere between (800 ms+40 ms) and (800 ms+60 ms).

As can be seen from the foregoing, by presenting the response so that it initially does not overlap the hit window and iteratively change the response so it overlaps the window at some point in time, a series of "false-true responses" to the stimulus can be obtained and such a series will yield a range of time which includes the starting time of the hit window.

In accordance with one embodiment of the present invention, it is important to select a response time increment of an appropriate value. If the response time increment is too high, the range of time which includes the start of the hit window may be unduly broad. If, however, the response time increment is too low, then an excessive number of test trials will be carried out in step 408, making this an unduly time-consuming step.

If the identified range of time that includes the starting time of the hit window is unduly large and more precision is desired, step 410 may optionally be performed to narrow the identified range of time that includes the starting time. By way of example, when the identified range of time is ascertained, the start of the identified range of time may be made coincident with time associated with the end of the response. Either the starting time of the response or the length of the response may then be iteratively lengthened with a smaller response time increment than was used in the earlier iteration to cause an overlap to occur in order to obtain a narrower range of time that includes the starting time of the hit window. By way of example, the response time increment may be divided by some value (e.g., 2, 5, 10, 20, etc.) each time a new iteration starts. Step 410 may be repeated as many times as necessary in order to obtain the range of time with the desired precision in order to narrow down the starting time of the hit window.

A step 412 includes identifying a range of time, which includes the ending point of the hit window. One skilled in the art, upon reviewing the teachings of the present invention, will recognize that a combination of "true-false" responses obtained by iteratively adding the response time increment to either the start time of the response or the duration of the response will provide information regarding the range of time that includes the ending time of the hit window.

Alternatively, the end time of the response can be initially set to a value that exceeds the end of the hit window, and either the start time of the response may be decreased or the duration of the response may be reduced (keeping the end time of the response fixed) to cause the overlap between the hit window and the response to disappear, thereby producing the series of "true-false" responses from which the range of time containing the end of the hit window may be obtained. Of course the range of time that includes the start of the hit window may be ascertained in this manner as well, i.e., by initially setting either the start time of the response or the duration of the response such that there is initially an overlap and either reducing the start time of the response or the duration of the response until the overlap disappears to ascertain the range of time that includes the end of the hit window.

As with the identification of the start of the hit window, the range of time that includes the end of the hit window may be narrowed iteratively until a range with the desired precision is obtained. This step is shown as step 414 in FIG. 5B.

Recognizing that the duration of the hit window may be one dummy letter, in one embodiment of the present invention, steps 412 and 414 may be avoided completely and the duration of a dummy letter may be added to the range of response time that includes the starting time of the hit window to yield the duration of a hit window. If it is found that the duration of hit window decreases when using different computers, however, steps 412 and 414 as described above may be performed to standardize the duration of the hit window.

The present invention provides several advantages not realized currently. By way of example, the present invention provides a system and an automated process of quickly determining the position of a hit window or range of response time relative to a stimulus. As another example, testing of a certain computer, according to the present invention, may be performed once and the resulting matrices may stored and used during subsequent uses of the diagnostic/training software on that computer. Thus, a library of matrices may be generated and stored for different computers that may run the diagnostic/training software, allowing diagnostic/training software manufacturers to standardize the presentation of range of response time regardless of the type of computer that is used to run the software.

Although the foregoing invention has been described in some detail for purposes of clarity of understanding, it will be apparent that certain changes and modifications may be practiced within the scope of the appended claims. For example, while the specification has been described in terms of standardizing the presentation of a range of response time relative to a sound stimulus when different computers are used to run the software, there is in principal no reason why the teachings of the present invention cannot apply to similarly standardizing the range of response time for other kinds of stimuli, such as visual stimuli, when different computers are employed to run the software. As a further example, although two different computers 102 and 104 are depicted in the arrangement of FIG. 2, the generating of the stimuli, the simulation of the responses, and the analysis of the series of "false-true" and "true-false" responses to obtain the ranges of time that include the start and end of the hit window may, if desired, be performed by a single computer (e.g., the computer expected to administer the test). Therefore, the present embodiments are to be considered as illustrative and not restrictive, and the invention is not to be limited to the details given herein, but may be modified within the scope of the appended claims.

What is claimed is:

1. A computer-implemented apparatus for ascertaining a hit window relative to stimuli, comprising:

means for generating said stimuli, means for simulating responses to said stimuli, said responses being variable in time so that at least one of said responses overlaps said hit window and another one of said responses does not overlap said window;

means for analyzing said responses to ascertain a start time of said hit window and an ending time for said hit window.

2. A system for standardizing presentation of a hit window relative to presentation of user stimuli for an input device used in conjunction with a computer system to ensure that a beginning and a duration of a range of response time is substantially consistent across different administering computers, said system comprising:

a first circuit capable of generating a stimulus, wherein the first circuit includes a processor configured to ascertain a start time of said hit window and an ending time of said hit window;

a second circuit capable of simulating responses to the stimulus;

a data acquisition interface electrically connected to the first circuit and electrically connected to the second circuit; and an input device electrically connected to the data acquisition interface.

3. The system of claim 2 further including an output port electrically connected to the first circuit.

4. The system of claim 2 wherein the second circuit includes a relay chip electrically connected to the data acquisition interface.

5. The system of claim 4 further including data instructions to drive the relay chip.

6. The system of claim 2 wherein the second circuit includes a signal line driver electrically connected to the data acquisition interface.

7. The system of claim 6 further including data instructions to drive the signal line driver.

8. The system of claim 2 wherein the stimuli is an auditory stimuli.

9. The system of claim 2 wherein the input device is a mouse.

10. The system of claim 2 wherein the stimulus is included in a training program.

11. The system of claim 10 wherein the training program is designed to build language skills in children.

12. The system of claim 2 further including at least one transducer for delivering the stimulus.

13. The system of claim 2 wherein the at least one transducer includes a sound generator.

14. The system of claim 2 wherein the second circuit includes a data acquisition processor.

* * * * *